United States Patent
Porte et al.

(10) Patent No.: US 8,425,283 B2
(45) Date of Patent: Apr. 23, 2013

(54) VENTILATING AIR INTAKE ARRANGEMENT

(75) Inventors: Alain Porte, Colomiers (FR); Damien Prat, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 897 days.

(21) Appl. No.: 11/721,917

(22) PCT Filed: Dec. 12, 2005

(86) PCT No.: PCT/FR2005/003101
§ 371 (c)(1),
(2), (4) Date: Jun. 15, 2007

(87) PCT Pub. No.: WO2006/067296
PCT Pub. Date: Jun. 29, 2006

(65) Prior Publication Data
US 2009/0253361 A1      Oct. 8, 2009

(30) Foreign Application Priority Data
Dec. 20, 2004   (FR) ...................................... 04 13554

(51) Int. Cl.
*B64D 13/02*    (2006.01)

(52) U.S. Cl.
USPC .......................................................... 454/73

(58) Field of Classification Search .................... 454/73, 454/74, 71, 72, 75, 76
See application file for complete search history.

(56) References Cited

U.S. PATENT DOCUMENTS

| | | | | |
|---|---|---|---|---|
| 3,611,724 A * | 10/1971 | Kutney | | 60/226.1 |
| 3,915,413 A * | 10/1975 | Sargisson | | 244/53 B |
| 3,967,443 A * | 7/1976 | McMurtry | | 60/226.1 |
| 4,132,240 A * | 1/1979 | Frantz | | 137/15.1 |
| 4,155,221 A * | 5/1979 | Dhoore et al. | | 60/226.1 |
| 4,404,713 A * | 9/1983 | Dorsey | | 24/662 |
| 5,000,399 A * | 3/1991 | Readnour et al. | | 244/53 B |
| 5,226,455 A | 7/1993 | DuPont et al. | | |
| 5,244,184 A * | 9/1993 | Larseneur | | 251/294 |
| 6,231,006 B1 | 5/2001 | Gruensfelder et al. | | |
| 6,899,513 B2 * | 5/2005 | Eleftheriou | | 415/1 |
| 2005/0039437 A1 * | 2/2005 | Lair | | 60/204 |

FOREIGN PATENT DOCUMENTS
BE   464754   5/1946

OTHER PUBLICATIONS
International Search Report dated Apr. 5, 2005.

* cited by examiner

*Primary Examiner* — Steven B McAllister
*Assistant Examiner* — Brittany E Towns
(74) *Attorney, Agent, or Firm* — Dickinson Wright PLLC

(57) ABSTRACT

An aircraft ventilating air intake arrangement has an air passage channel and an air vent that ventilate a confined cone in an aircraft with fresh air entering the channel upstream and exiting the channel downstream towards the zone to be ventilated. A controllable blocking device enables the cross section of the channel to be varied with an elastically deformable membrane, under the action of fluid control, according to the speed and the altitude of the aircraft.

7 Claims, 6 Drawing Sheets

VENTILATING AIR INTAKE ARRANGEMENT

FIELD OF THE INVENTION

The present invention relates to a ventilating air intake arrangement comprising an air passage channel with an air vent, designed to ventilate at least one confined zone in a vehicle, for example an aircraft.

BACKGROUND OF THE RELATED ART

It is known that such ventilating air intake arrangements are widely used in the aeronautical field for air renewal purposes in a confined zone containing thermally sensitive equipment and/or hazardous ambient media, of the flammable or explosive type, for which it is necessary to ensure continuous ventilation of the zone in order to avoid any risk of the equipment malfunctioning or of a surrounding incident.

Such is particularly the case with the numerous mechanical and/or electrical devices provided in the annular confined space or zone between the engine nacelle and the external fan casing and the compressors of an airplane jet engine. These devices, such as, for example, the fadec (full authority digital engine control), the gearbox, the engine oil tank, the fluid components, and so on, normally fixed all around the external casing and thus located in the confined zone, are ventilated by the external air entering into the arrangement through the air vent to pass through the channel provided in the nacelle and be diffused, on exiting from the channel, in the confined zone. The devices, just like the oil or other vapors emanating from this space, are ventilated by the external fresh air diffused by the air channel, which helps to ensure that they operate correctly.

To satisfy current regulations, which impose an appropriate air renewal rate per unit of time in the confined zone concerned, the air passage channel of the arrangement has a predetermined cross section allowing the circulation of a sufficient quantity of air in the channel to ensure, at its outlet, the renewal of air in the confined zone containing the devices to be ventilated.

However, the devices to be cooled and the vapors to be expelled are not ventilated optimally by the known air intake arrangements.

In practice, in these arrangements, while the outside air entering upstream through the air vent into the channel with predetermined cross section of the arrangement and exiting downstream of the latter is sufficient to correctly ventilate the devices when the aircraft is in the taxiing phase, in a take-off phase or in a waiting phase, and therefore at low speed, on the other hand, when the aircraft is in cruising flight phase at maximum speed and altitude, the quantity of air or the air flow rate exiting from the channel of the arrangement towards the zone to be ventilated is too great. This means that the devices are cooled too much, all the more so since the temperature of the external air is very low at this cruising altitude, which can lead to malfunctions. Measurements have, moreover, shown that, in this flight phase, the air circulating in the confined zone via the channel of the arrangement was renewed twice as much as necessary, such that the fadec, in particular, is cooled excessively, which can be prejudicial to its satisfactory operation.

SUMMARY OF THE INVENTION

The object of the present invention is to remedy these drawbacks, and relates to an air intake arrangement, the design of which makes it possible to ensure optimal ventilation of a confined zone such as that above a jet engine—but which can also be a lighting zone or a central zone of the airplane (belly fairing) or, generally, any zone that is more or less closed and thermally sensitive in a vehicle for which air renewal is required.

To this end, the ventilating air intake arrangement comprising at least one air passage channel with an air vent, designed to ventilate at least one confined zone in an aircraft with fresh air entering upstream, through said air vent, into said channel and exiting downstream of the latter towards said zone to be ventilated, said air intake arrangement comprising controllable blocking means enabling the cross section of said channel to be varied, is noteworthy, according to the invention, in that said controllable blocking means comprise at least one membrane, elastically deformable under the action of a fluid control, such that the cross section of said channel varies according to the speed and the altitude of said aircraft.

Thus, with the invention, the cross section of the channel of the air intake arrangement can be varied by deformable blocking means and the air flow rate entering into the confined zone can be modified, according to the flight phases of the airplane, and therefore, the devices concerned can be optimally ventilated.

For example, when the airplane is in cruising flight (maximum speed and altitude), the cross section of the channel of the arrangement is advantageously reduced by the action of the deformable blocking means to reasonably ventilate the devices and so avoid an excessive cooling of the latter. However, when the airplane is taxiing or in a take-off phase (slow speed), the cross section of the channel is open to the maximum by the removal of said deformable blocking means, so as to have a maximum quantity of air circulate and the devices located in the confined zone appropriately ventilated.

Thus, with the invention, the quantity of air taken by the ventilating air intake arrangement is adapted to each flight phase, which minimizes the adverse effect on the performance levels of the aircraft due to the ventilation.

Furthermore, the simplicity with which the blocking means are implemented will be noted, whereby, with a volume-oriented deformation of the membrane in the channel, the cross section of the latter can be varied.

For example, said membrane is attached to a support with which it defines a variable internal volume and which is added in a fixed way to a lateral wall delimiting said channel.

Preferably, said channel has a rectangular cross section delimited by lateral walls opposing in pairs, one of the major lateral walls of said channel comprising said deformable blocking means which, when said cross section is at its maximum, are eliminated from said channel and, when said cross section is at its minimum, partially block said channel.

Said fluid control can comprise a controllable pressurized fluid source linked by a pipe to the deformable blocking means. However, in a particularly advantageous embodiment, in which said fluid control is automatic, the latter applies the total pressure (or shut-off pressure) on said aircraft of the fluid in which it moves. In this case, said fluid control comprises a link pipe, an upstream end of which takes said total pressure and the downstream end of which communicates with said deformable blocking means. This therefore constitutes a direct, independent, automatic and reliable control of the inflating of the membrane.

The upstream end of said link pipe can take said total pressure at the intake end of said air vent leading to the channel, while said downstream end of said pipe passes, in a sealed manner, through a communicating hole provided in said membrane.

The elastic deformation of said membrane can be guided axially, said link pipe serving as a guide for said membrane and being fitted perpendicularly into the center of said membrane. Thus, the deformation of the membrane is symmetrical and uniform.

Preferably, said elastically deformable membrane is circular or quadrangular, rectangular for example.

Moreover, the air intake arrangement can also comprise a protection element located at the air vent and at least partially covering said deformable blocking means.

BRIEF DESCRIPTION OF THE DRAWINGS

The figures of the appended drawing will give a good understanding of how the invention can be implemented. In these figures, identical references denote like elements.

DETAILED DESCRIPTION OF THE INVENTION

Figure 1:
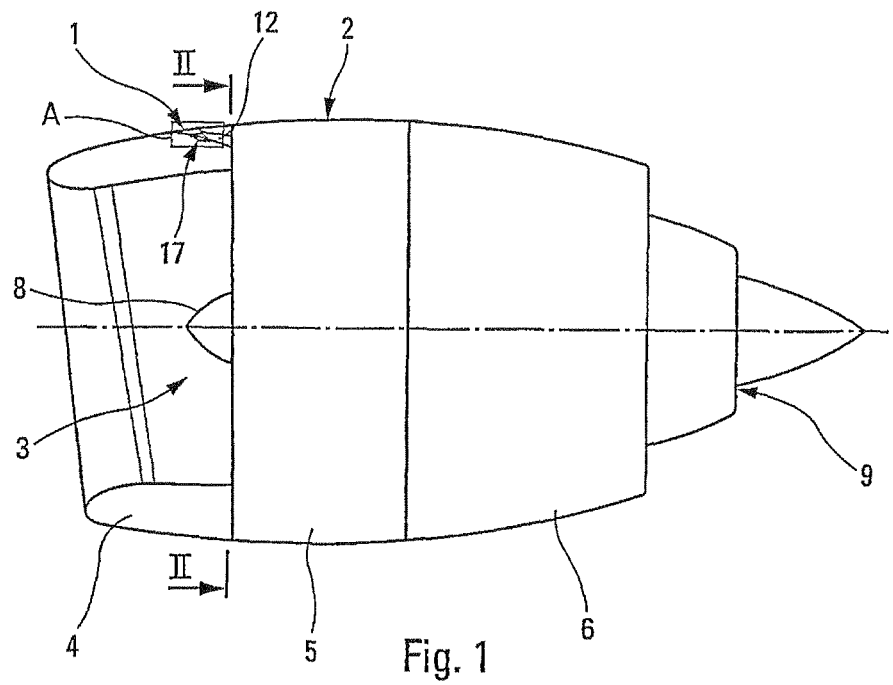
FIG. 1 diagrammatically and partially represents, in cross section, the nacelle of a jet engine provided with a ventilating air intake arrangement symbolized at A, according to the invention.

The ventilating air intake arrangement 1, according to the invention and delimited by a rectangle A in FIG. 1, is provided in a nacelle 2 of an airplane engine 3, such as a jet engine. As is diagrammatically shown in FIG. 1, the nacelle 2 usually comprises a front air intake part 4 for feeding air to the engine, a central part 5 surrounding the external casing 7 of the fan 8 and the compressors of the engine, and a rear part 6 surrounding the combustion chamber and the turbine, from which emerges the external casing of the nozzle 9 and its cone.

Figure 2:
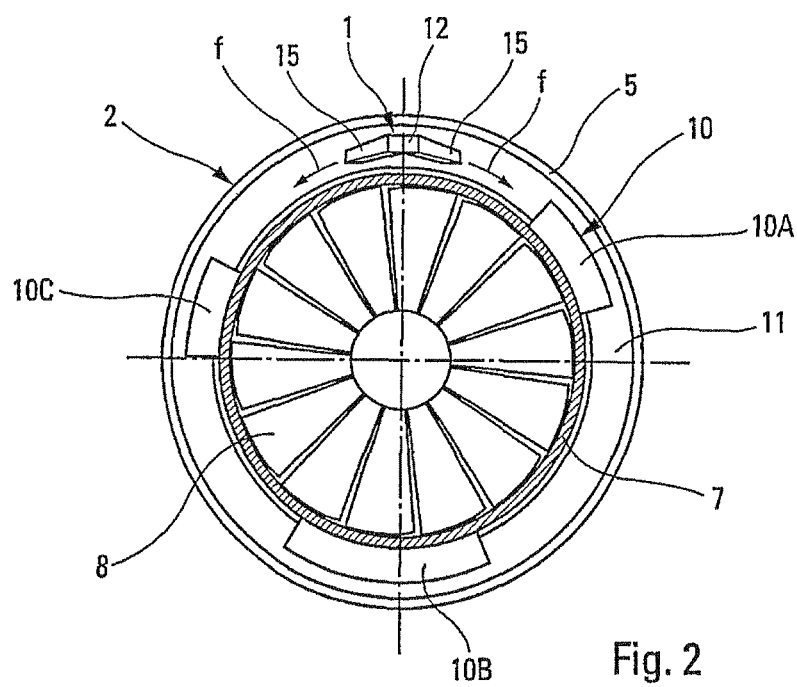
FIG. 2 is a front view, in partial cross section along the line II-II of FIG. 1, of said jet engine nacelle, showing the various devices to be ventilated.

Various mechanical and/or electrical devices or items of equipment 10 are added to the external casing 7 of the fan and the compressors, namely in the confined annular space or zone 11 between the nacelle 2 and the external casing 7 of the engine 3. FIG. 2 symbolically shows some of the devices 10 located in this zone 11, namely the fadec 10A, the gearbox 10B and the engine oil tank 10C.

The renewal of the air in this confined zone 11, to maintain the devices 10 in an appropriate temperature band and allow them to operate correctly, is ensured by the ventilating air intake arrangement 1 which is located at the top of the front part 4 of the nacelle 2 and comprises, to this end, an air passage channel 12 formed in the structural wall of the front part 4 and communicating the outside air with the confined zone 11. For this, the channel 12 has upstream an air vent 14 and, downstream, a diffuser 15 linked with said space, opening into the central part 5 of the nacelle.

To optimize the ventilation, the air passage channel 12 is slightly inclined relative to the outer surface of the part 4 of the nacelle and is directed forward towards the longitudinal axis of the engine, to best take and direct the outside fresh air into the channel and then expel it tangentially via a double diffuser 15, as shown by the arrows F in FIG. 2, on both sides of the annular confined space 11.

Figure 3:
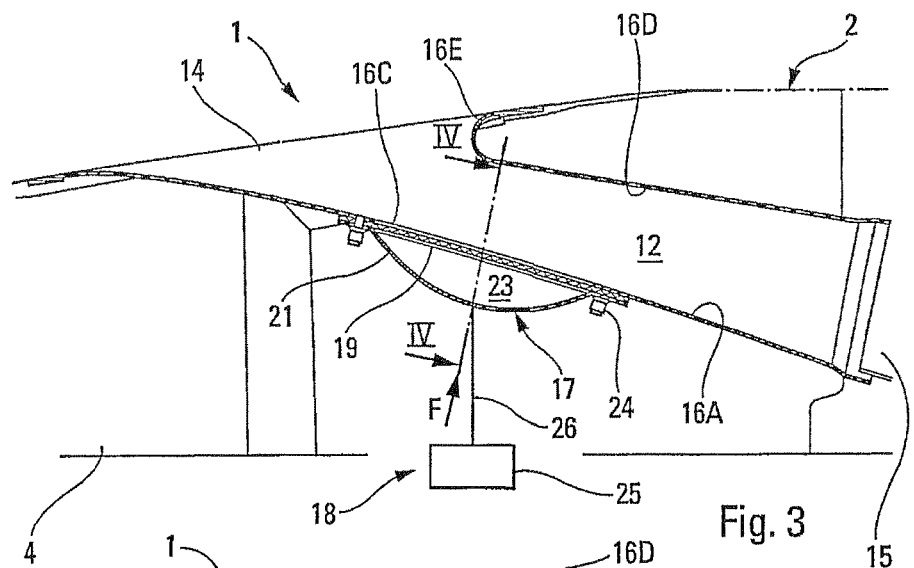
FIG. 3 is an enlarged longitudinal cross section of the arrangement of FIG. 1, allowing a maximum ventilating air intake.
Figure 4:
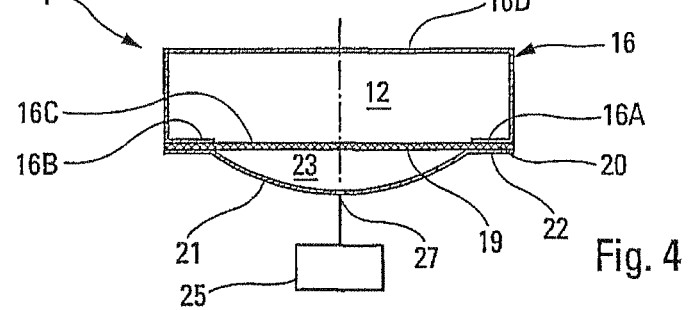
FIGS. 4 and 5 are respectively a cross section along the line IV-IV and a view according to the arrow F of the arrangement in FIG. 3.

The general profile of the channel 12 of the arrangement 1 represented in FIG. 3 is slightly tapered, that is, after having converged after its tangential air vent 14, it diverges somewhat towards the diffuser 15 and its cross section, delimited by the lateral walls 16, is, in this example, rectangular as shown in particular by FIG. 4.

Advantageously, this cross section of the channel 12 is made adjustable and, to this end, the ventilating air intake arrangement 1 comprises deformable blocking means 17 with fluid control 18. By varying this section, the quantity or flow of ventilating air towards the confined zone 11 can be reduced or increased, according to the speed and the altitude of the airplane.

Figure 5:
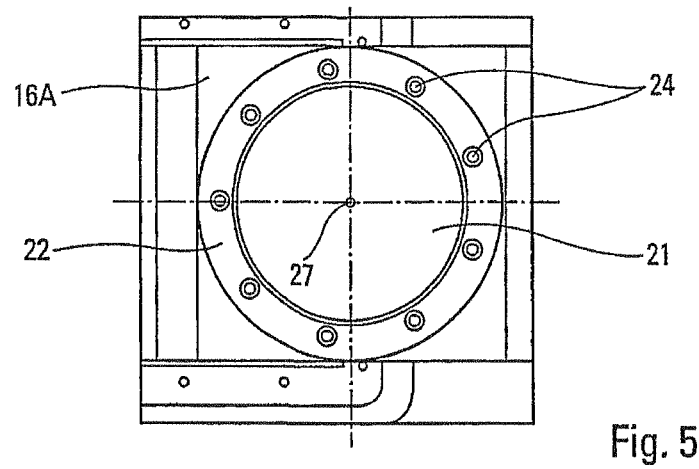

In the exemplary embodiment shown in FIGS. 3 to 5, the deformable blocking means 17 are defined by an elastically deformable and circular membrane 19, mounted on its periphery 20 on a flat circular edge 22 of a dished rigid support 21 forming between them an internal volume 23. The dished support 21 and its membrane 19 are then fixed, by link elements 24 such as screws, against the corresponding circular edge 16B of a circular opening 16C provided for this purpose in the bottom wall 16A of the channel, roughly in line with the connection between the top wall 16D of the channel and the corresponding rounded edge 16E of the air vent 14. At this point, the cross section of the channel 12 with tapered profile is smaller.

The fluid control 18 of these deformable blocking means 17 is, in this embodiment, provided by a controllable pressurized fluid source 25, symbolized by a rectangle and linked by a pipe or similar 26, and in a sealed manner, to a communicating hole 27 provided in the middle of the dished rigid support 21.

In FIGS. 3 to 5, the membrane 19 is in an inactive, flat position, merged with the bottom wall 16A of the channel, such that the cross section of the channel 12 is at its maximum allowing a maximum air flow rate towards the zone 11 to be ventilated containing the devices 10. Such a configuration of the membrane 19 is desirable in particular when the speed of the aircraft is low, particularly in the taxiing or take-off phase. The renewal of air in the confined zone is thus assured several times per unit of time.

Figure 6:
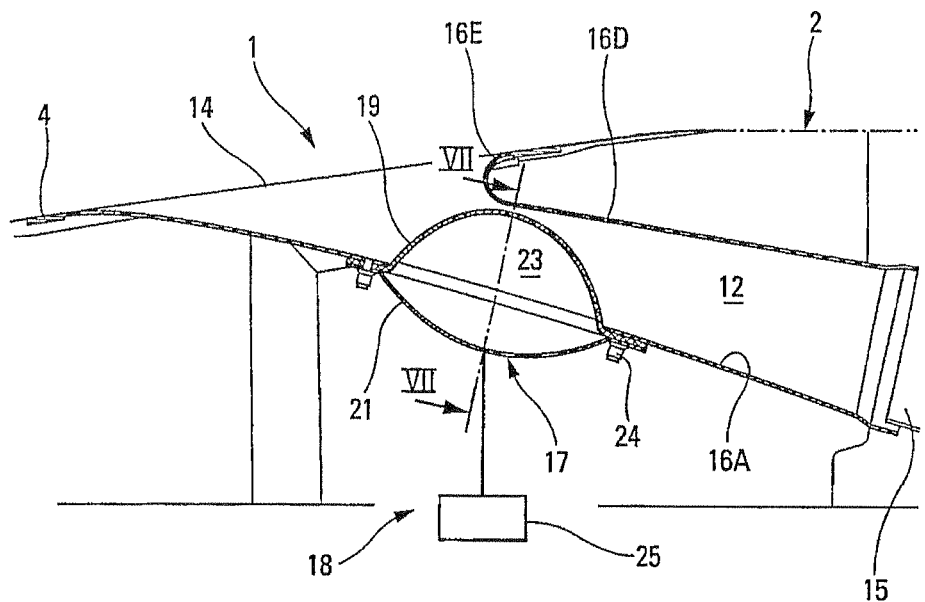
FIG. 6 is a cross section of the arrangement similar to FIG. 3, but allowing a minimum ventilating air intake.
Figure 7:
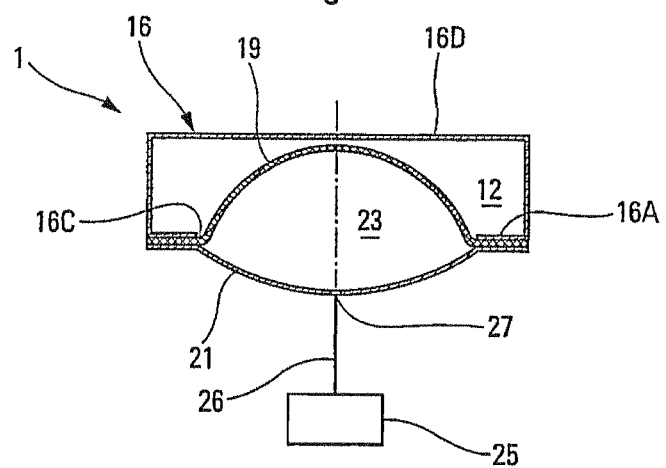
FIG. 7 is a cross section of the arrangement along the line VII-VII of FIG. 6.

In FIGS. 6 and 7, under the action of the pressurized source 25, the fluid, such as a gas, enters into the internal volume 23 of the means 17 via the pipe 26 and inflates the elastically deformable membrane 19. The latter takes a roughly hemispherical form until it touches the top wall 16D of the channel with its summit. As can be seen in particular in FIG. 7, in this inflated position, the rectangular cross section of the channel 12, designed to allow incoming outside air to pass through the air vent 14, is then reduced and, in this case, at its minimum since it is reduced by the semi-circular section of the inflated membrane 19 compared to FIG. 4. This way, the quantity of air passing through the channel 12 is limited and at its minimum, which means that a lesser ventilating air flow rate is diffused into the confined zone 11 and in this way prevents, by the inflation of the membrane, excessive cooling of the equipment concerned 10 when the aircraft is in cruising flight, that is at high altitude and at high speed.

Of course, the air flow rate diffused in the zone 11 can be modulated between the two minimum and maximum values by acting for this purpose on the inflation of the membrane 19 of the blocking means, the effect of which is to modify the cross section of said channel 12.

Figure 8:
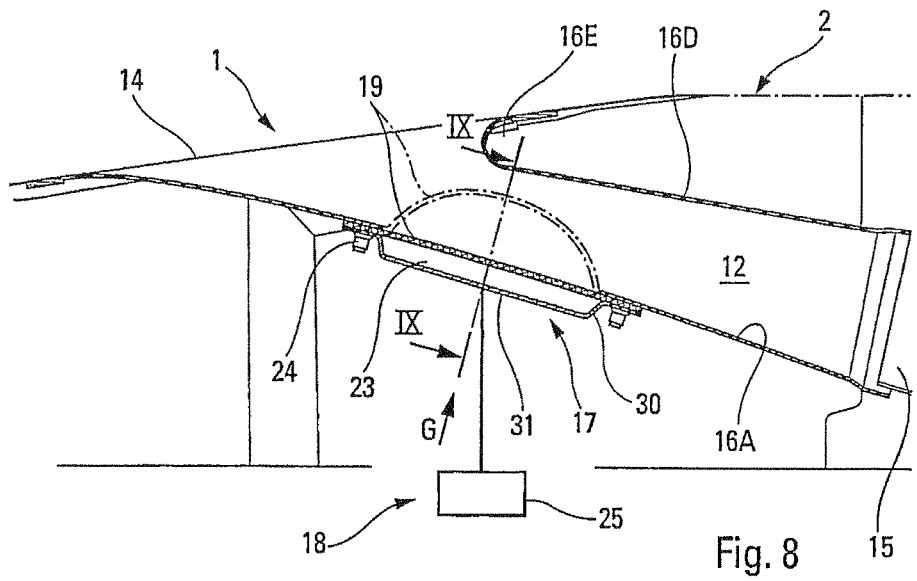
FIG. 8 represents an embodiment variant of said arrangement in enlarged longitudinal cross section.
Figure 9:
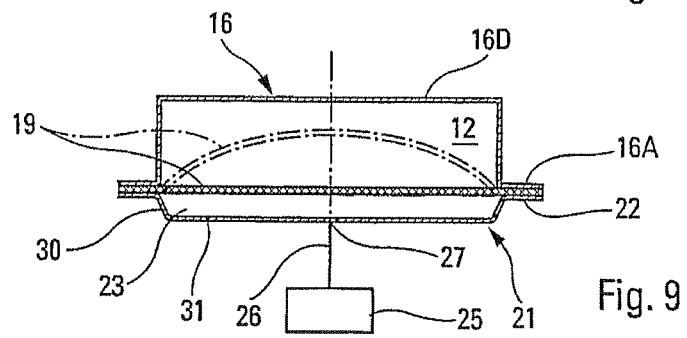
FIGS. 9 and 10 are respectively a cross section along the line IX-IX and a view according to the arrow G of the arrangement of FIG. 8.
Figure 10:
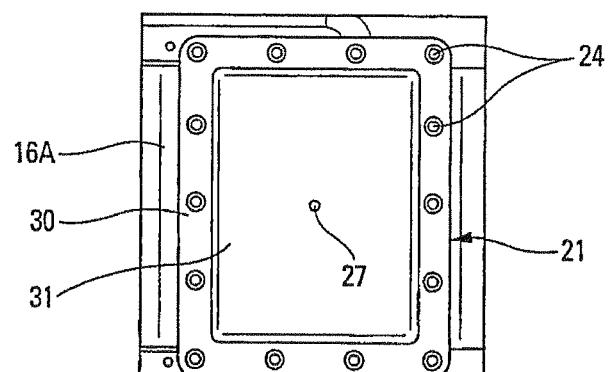

The embodiment variant of the blocking means 17 of the arrangement 1 illustrated in FIGS. 8 to 10 differs in that the rigid support 21 and the elastically deformable membrane 19 are rectangular. Thus, the support 21 takes the form of a rectangular dish 30 with flat bottom 31, while the membrane is mounted on the corresponding flat peripheral edge 22 of the support, defining with the latter the variable internal volume 23. The assembly comprising support 21 and membrane 19 is fixed by screws 24 to the bottom wall 16A of the channel, the cross section of which is still rectangular, and in a same place as previously. A communicating hole 27 provided in the flat bottom 31 of the support 21 allows the internal volume 23 to communicate with the pressurized fluid source 25 via the pipe 26.

The operation of the deformable blocking means 17 for the purposes of varying the passage section of the channel 12 via the rectangular membrane 19 is, of course. similar to the previous embodiment of FIGS. 3 to 7. A position shown by chain-dotted lines of the inflated membrane 19 is represented in FIGS. 8 and 9.

Figure 11:
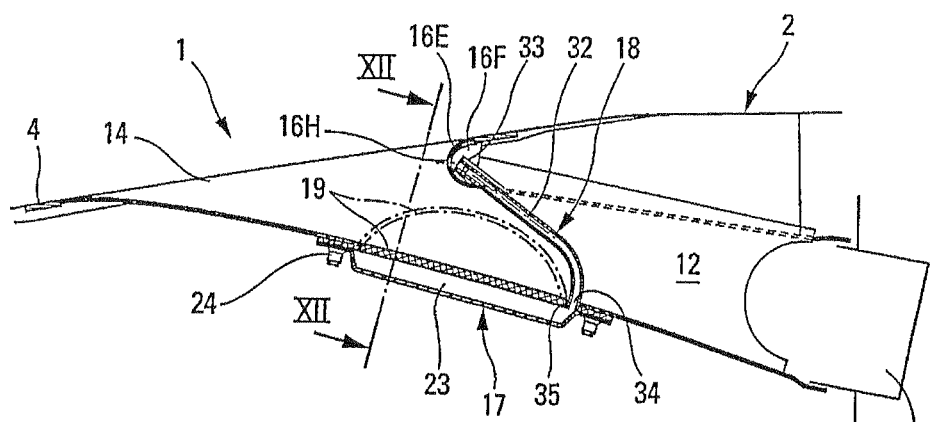
FIG. 11 represents another embodiment variant of said arrangement in enlarged longitudinal cross section.
Figure 12:
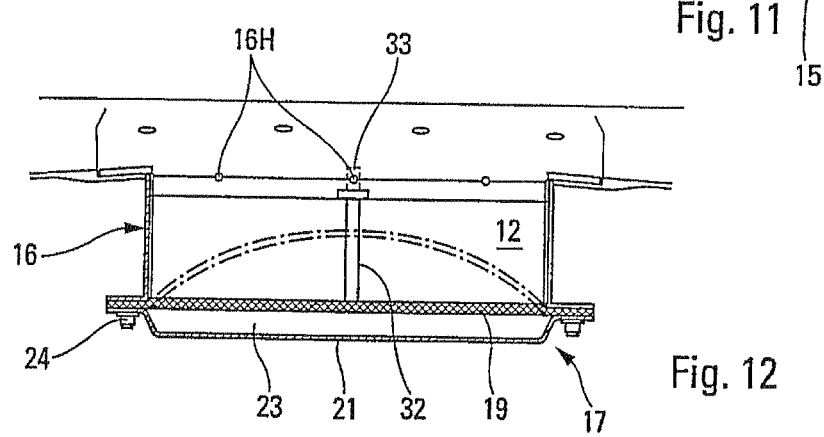
FIG. 12 is a cross section of the arrangement along the line XII-XII of FIG. 11.

In a preferred embodiment variant of the arrangement 1 shown in FIGS. 11 and 12, the blocking means 17 are similar to those described previously and comprise a rectangular support 21 (or dish 30) with flat bottom 31 and an elastically deformable membrane 19, the assembly comprising support 21 and membrane 19 being disposed in the same way in the rectangular section channel 12. However, the fluid control 18, to act on the membrane, applies the total pressure on the airplane of the fluid in which it moves and comprises, in place of a pressurized fluid source 25, a link pipe 32, similar to a Pitot tube, an upstream end 33 of which is in direct contact with the outside air and the downstream end 34 of which opens into the internal volume 23 of the support-membrane assembly.

More particularly, the pipe 32 crosses the channel through the walls 16A and 16D, and its upstream end 33 is located in a hollow space 16F in the top rounded edge 16E of the channel, partly delimiting the air vent 14 and constituting a front edge of the arrangement 1. Advantageously, at least one total pressure vent 16H is provided in the wall of the top edge 16E to allow the upstream end 33 of the pipe to communicate with the outside environment (air), and the downstream end 34 of the pipe passes in a sealed manner through a hole 35 provided in the membrane 19 and opening into the internal volume 23.

Thus, it will be understood that the inflation of the elastically deformable membrane 19 is automatic according to the total pressure at the pressure vents 16H, via the pipe 32 and the internal volume 23 of the blocking means 17. There is thus obtained an automatic and independent adjustment of the cross section of the channel. For example, when the aircraft is at minimum speed (taking off or taxiing), the total pressure in the pipe 32 is low such that the membrane 19 is little or not at all inflated, and the air passage cross section in the channel 12 of the arrangement 1 is then at or near its maximum, allowing an appropriate ventilation of the devices 10 in the confined zone 11.

However, when the aircraft is in cruising flight approaching maximum speed, the total pressure in the pipe 32 via the vents 16H and then in the internal volume 23 is high and generates the inflation of the membrane 19 in the channel 12 and, simultaneously, a reduction in the passage cross section of the latter. Thus, the air flow rate diffused in the confined zone 11 is less, preventing an excessive cooling of the devices 10 while ensuring acceptable ventilation.

Figure 13:
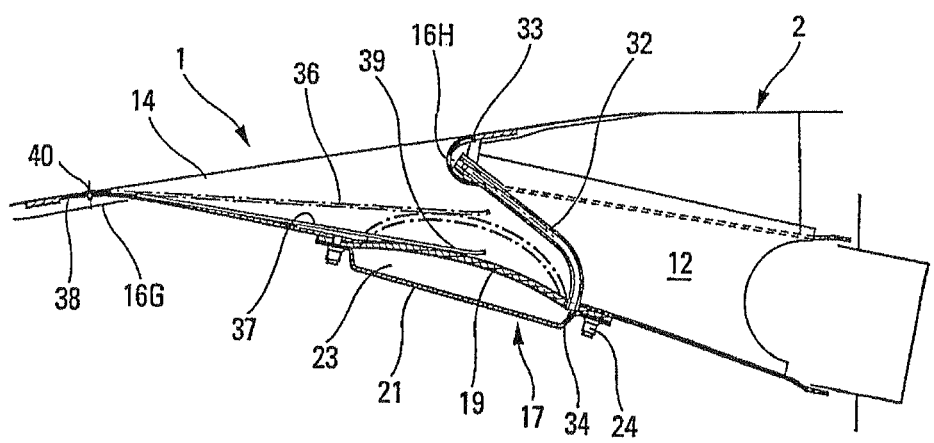
FIG. 13 shows the arrangement represented in FIG. 11, equipped with a protection element.

The ventilating air intake arrangement 1 represented in FIG. 13 comprises an element 36 protecting the elastically deformable membrane 19 of the blocking means 17. This element 36 is defined simply by a thin flexible plate 37 which extends from the rounded bottom edge 16G of the air vent 14 and over the width of the channel, to the middle, at least, of the membrane. The upstream end 38 of the flexible plate is then hinged on the rounded bottom edge 16G by screws 40, while its downstream end 39 is free and rests elastically on the membrane. Thus, the plate 37 protects the membrane 19 from the external medium entering into the channel, optimizes the flow of the air entering into the channel 12 and, under its natural elastic action, returns the membrane to the deflated position when the pressure from the pipe ceases.

In FIGS. 11 to 13, the pipe 32 is shown crossing the channel 12. Of course, it is, if necessary, possible to have said channel circumvented by the pipe 32, if it is desirable for the latter not to disrupt the passage of cooling air in said channel 12.

Figure 14:
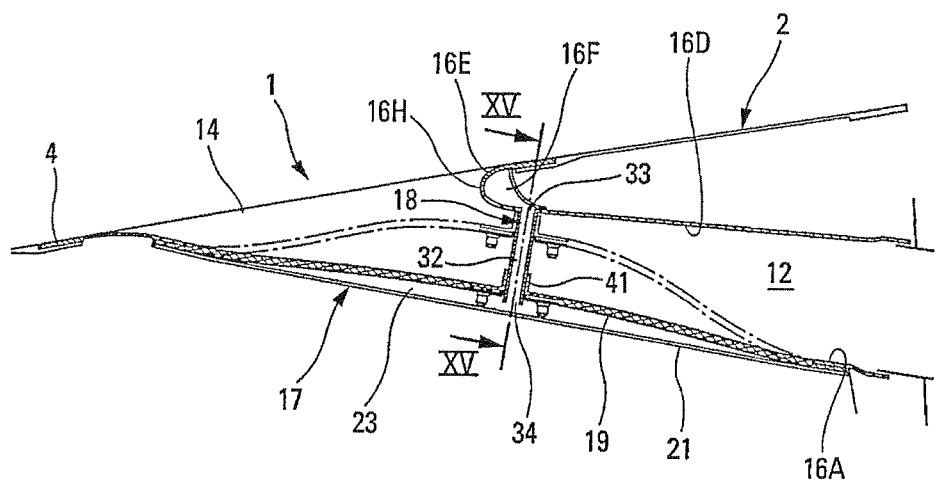
FIG. 14 also represents another embodiment variant of said arrangement in enlarged longitudinal cross section.
Figure 15:
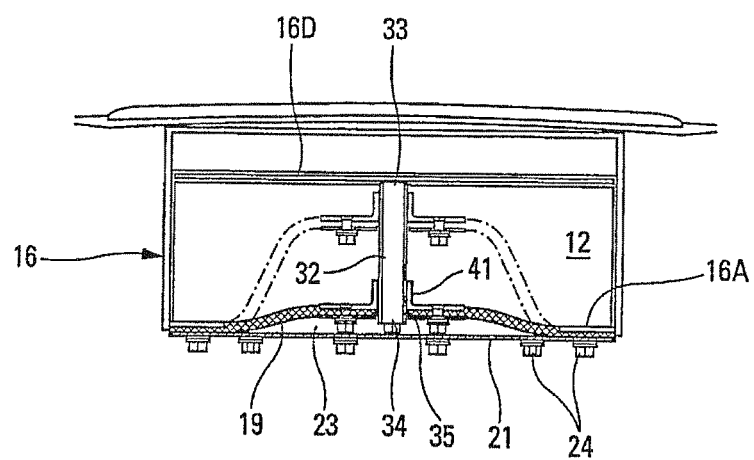
FIG. 15 is a cross section of the arrangement along the line XV-XV of FIG. 14.

In the embodiment variant of said arrangement 1 represented in FIGS. 14 and 15, however, the fact that the link pipe 32 passes through said channel 12 is exploited to use as a guide for the elastically deformable membrane 19 when the latter passes from a deflated state to an inflated state and vice versa.

For this, the link pipe 32 is perpendicular to the membrane 19 and its downstream end 34 is connected to the center of the membrane to open into the internal volume 23 via a hole 35 provided in the latter. An intermediate bearing 41 joins the downstream end 34 of the pipe to the membrane 19. As for the upstream end 33 of the pipe, it is incorporated in the corresponding wall of the rounded top edge 16E delimiting the channel. Thus, during its expansion and retraction phases, the elastic membrane 19 retains a roughly symmetrical and uniform shape.

The variation of the cross section of the channel 12 for air renewal in the confined zone 11 according to the speed and the altitude of the airplane is, of course, similar to the embodiment described in light of FIGS. 11 and 12.

The invention claimed is:
1. A ventilating air intake arrangement comprising:
a structure comprising at least one air passage channel, including an air vent having an air intake edge, to ventilate at least one confined zone in an aircraft with fresh air entering upstream, through said air vent, into said air passage channel and exiting downstream of the air passage channel towards said confined zone to be ventilated, and
a controllable blocking device that is configured to vary the cross section of said air passage channel, wherein:
said controllable blocking device comprises at least one membrane disposed at least partially in said air passage channel, elastically deformable under the action of a fluid control device, to vary the cross section of said air passage channel according to the speed and the altitude of said aircraft, and said fluid control device comprises a link pipe, having an upstream end, a downstream end, and an open continuous path between said upstream end and said downstream end, said upstream end takes total pressure of the air entering through said air intake edge of the air vent and said downstream end of said link pipe applies said total pressure on said membrane so that said total pressure acts directly on said membrane for varying the cross section of said air passage channel.

2. The arrangement as claimed in claim 1, wherein the upstream end of said link pipe takes said total pressure at the intake end of said air vent leading to the channel, and said downstream end of said pipe passes, in a sealed manner, through a communicating hole provided in said membrane.

3. The arrangement as claimed in claim 1, wherein said membrane is attached to a support with which it defines a variable internal volume and which is added in a fixed way to a lateral wall delimiting said channel.

4. The arrangement as claimed in claim 1, wherein said air passage channel has a rectangular cross section delimited by lateral walls opposing in pairs, one of the major lateral walls of said air passage channel comprising said elastically deformable membrane which, when said cross section is at its maximum, is eliminated from said air passage channel and, when said cross section is at its minimum, partially blocks said air passage channel.

5. The arrangement as claimed in claim 1, wherein the elastic deformation of said membrane is guided axially and said link pipe serves as a guide for said membrane and fits perpendicularly into the center of said membrane.

6. The arrangement as claimed in claim 1, wherein said elastically deformable membrane is one of circular or quadrangular.

7. The arrangement as claimed in claim 1, further comprising a protection element at least partially covering said elastically deformable membrane.

* * * * *